United States Patent
Lu et al.

(10) Patent No.: US 12,133,309 B2
(45) Date of Patent: Oct. 29, 2024

(54) LIGHTING DEVICE HAVING REPLACEABLE INTELLIGENT SENSOR

(71) Applicant: Xiamen PVTECH Co., Ltd., Fujian (CN)

(72) Inventors: Fuxing Lu, Fujian (CN); Longyin Chen, Fujian (CN); Rongtu Liu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 39 days.

(21) Appl. No.: 18/199,326

(22) Filed: May 18, 2023

(65) Prior Publication Data
US 2024/0244728 A1    Jul. 18, 2024

(30) Foreign Application Priority Data
Jan. 16, 2023 (CN) .......................... 202310067930.8

(51) Int. Cl.
*H05B 47/115* (2020.01)
*H05B 45/37* (2020.01)
*H05B 47/19* (2020.01)

(52) U.S. Cl.
CPC .......... *H05B 47/115* (2020.01); *H05B 45/37* (2020.01); *H05B 47/19* (2020.01)

(58) Field of Classification Search
None
See application file for complete search history.

(56) References Cited

U.S. PATENT DOCUMENTS

2012/0043889 A1 * 2/2012 Recker .................. H05B 45/38
                                                                            315/86
2016/0374168 A1 * 12/2016 Ackmann ............. H05B 45/14

FOREIGN PATENT DOCUMENTS

JP         2020107527 A * 7/2020

* cited by examiner

*Primary Examiner* — Anh Q Tran
(74) *Attorney, Agent, or Firm* — Winston Hsu

(57) ABSTRACT

A lighting device having replaceable intelligent sensor includes a filter, a first voltage converter, a DC-to-DC converter, an intelligent sensor, a control circuit, a load and a rectifier. The first voltage converter is connected to the filter. The DC-to-DC converter is connected to the first voltage converter. The intelligent sensor is detachably connected to the DC-to-DC converter. The control circuit is connected to the filter, and includes an optical coupler and a switch connected to each other. The load is connected to the control circuit. The rectifier is connected to the filter and an external power source in order to drive the intelligent sensor and the control circuit. The intelligent sensor generates a first control signal to control the optical coupler to turn on the switch, such that the control circuit generates a driving signal to drive the load.

10 Claims, 6 Drawing Sheets

LIGHTING DEVICE HAVING REPLACEABLE INTELLIGENT SENSOR

BACKGROUND OF THE INVENTION

1. Field of the Invention

The present invention relates to a lighting device, in particular to a lighting device having replaceable intelligent sensor.

2. Description of the Prior Art

As global warming phenomenon gradually becomes severer, achieving energy saving has become a common goal of many countries in the world. Many buildings, such as government agencies, office buildings, schools, shopping malls, and garages, require lighting devices to be in on state for a long period of time. In order to reduce the energy consumption of these lighting devices, a large amount of money and manpower is needed to replace or substantially modify these lighting devices, which cannot meet actual requirements. In addition, these lighting devices cannot provide intelligent functions, which greatly limits the application thereof and cannot meet the future development trend. Moreover, the users cannot effectively monitor these lighting devices, so the users cannot conveniently maintain or repair these lighting devices.

SUMMARY OF THE INVENTION

One embodiment of the present invention provides a lighting device having replaceable intelligent sensor, which includes a filter, a first voltage converter, a DC-to-DC converter, an intelligent sensor, a control circuit, a load and a rectifier. The first voltage converter is connected to the filter. The DC-to-DC converter is connected to the first voltage converter. The intelligent sensor is detachably connected to the DC-to-DC converter. The control circuit is connected to the filter, and includes an optical coupler and a switch connected to each other. The load is connected to the control circuit. The rectifier is connected to the filter and an external power source in order to drive the intelligent sensor and the control circuit. The intelligent sensor generated a first control signal to control the optical coupler to turn on the switch, whereby the control circuit generates a driving signal to drive the load.

In one embodiment, the optical coupler includes a photodiode and a phototransistor. The phototransistor receives the first control signal.

In one embodiment, the lighting device includes a second voltage converter connected to the filter and a microwave sensor connected to the second voltage converter, such that the control circuit is connected to the filter via the microwave sensor and the second voltage converter.

In one embodiment, the microwave sensor detects a moving object to generate a sensing signal in order to control the optical coupler to turn on the switch, such that the control circuit generates the driving signal to drive the load.

In one embodiment, the optical coupler includes a photodiode and a phototransistor. The phototransistor receives the sensing signal.

In one embodiment, the intelligent sensor outputs a second control signal to the microwave sensor in order to change the operational mode of the microwave sensor.

In one embodiment, the intelligent sensor is a WiFi module, a Bluetooth module, a ZigBee module, a sensor having WiFi communication function and Bluetooth communication function, a sensor having Bluetooth communication function and ZigBee communication function, a sensor having ZigBee communication function and the WiFi communication function, or other similar components.

In one embodiment, the intelligent sensor receives the operational data of the load and transmits the operational data to an external electronic device.

In one embodiment, the load is a light-emitting diode (LED).

In one embodiment, the filter is a $\pi$ filter, the rectifier is a bridge rectifier and the switch is a relay.

The lighting device having replaceable intelligent sensor in accordance with the embodiments of the present invention may have the following advantages:

(1) In one embodiment of the present invention, the lighting device includes a filter, a first voltage converter, a DC-to-DC converter, an intelligent sensor, a control circuit, a load and a rectifier. The first voltage converter is connected to the filter. The DC-to-DC converter is connected to the first voltage converter. The intelligent sensor is detachably connected to the DC-to-DC converter. The control circuit is connected to the filter, and includes an optical coupler and a switch connected to each other. The load is connected to the control circuit. The filter is connected to the filter and an external power source so as to drive the intelligent sensor and the control circuit. The intelligent sensor generates a first control signal to control the optical coupler to turn on the switch, such that the control circuit generates a driving signal to drive the load. The above circuit design of the lighting device makes the intelligent sensor be replaceable, so the user can replace the intelligent sensor by another intelligent sensor according to actual requirements. The above circuit design can be compatible with intelligent sensors having different driving currents. Thus, the lighting device can be more flexible in use and meet actual requirements.

(2) In one embodiment of the present invention, the lighting device includes a first direct-current (DC) power supply path formed by the first voltage converter and a second DC power supply path formed by the second voltage converter. The lighting device can drive the intelligent sensor by the first DC power supply path, and drive the microsensor and the load via the second DC power supply path. The above power supply path design can be compatible with the circuit designs of most of currently available lighting devices without the need to significantly change the circuit designs of these lighting devices. Thus, the lighting device can be more comprehensive in application. In addition, the lighting device can be more energy-saving and the cost thereof can also be reduced.

(3) In one embodiment of the present invention, the lighting device can generate the first control signal via the intelligent sensor to turn on the optical coupler of the control circuit so as to turn on the switch, such that the control circuit can generate the driving signal to drive the load. Thus, the lighting device can realize large signal control by small signal. Accordingly, the performance of the lighting device can be greatly enhanced.

(4) In one embodiment of the present invention, the lighting device can generate a second control signal to the microwave sensor to change the operational mode of the microwave sensor. Therefore, the user can dynamically adjust the operational mode of the microwave sensor according to actual needs. Accordingly, the lighting device can satisfy actual requirements.

(5) In one embodiment of the present invention, the lighting device can receive the operational data of the load via the intelligent sensor and transmit the operational data to an external electronic device. Thus, the user can effectively monitor the operational states (e.g., battery level, current, voltage, etc.), and repair or maintain the lighting device when any one of the operational states of the load is abnormal. Thus, the user can conveniently repair or maintain the lighting device, so the lighting device can normally operate for a long time.

(6) In one embodiment of the present invention, several lighting devices can be connected to each other via the intelligent sensors, so the user can control or monitor all of these lighting devices via the external electronic device and the above intelligent connection function in order to execute various intelligent functions. Thus, the lighting device can definitely conform the future development trend.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
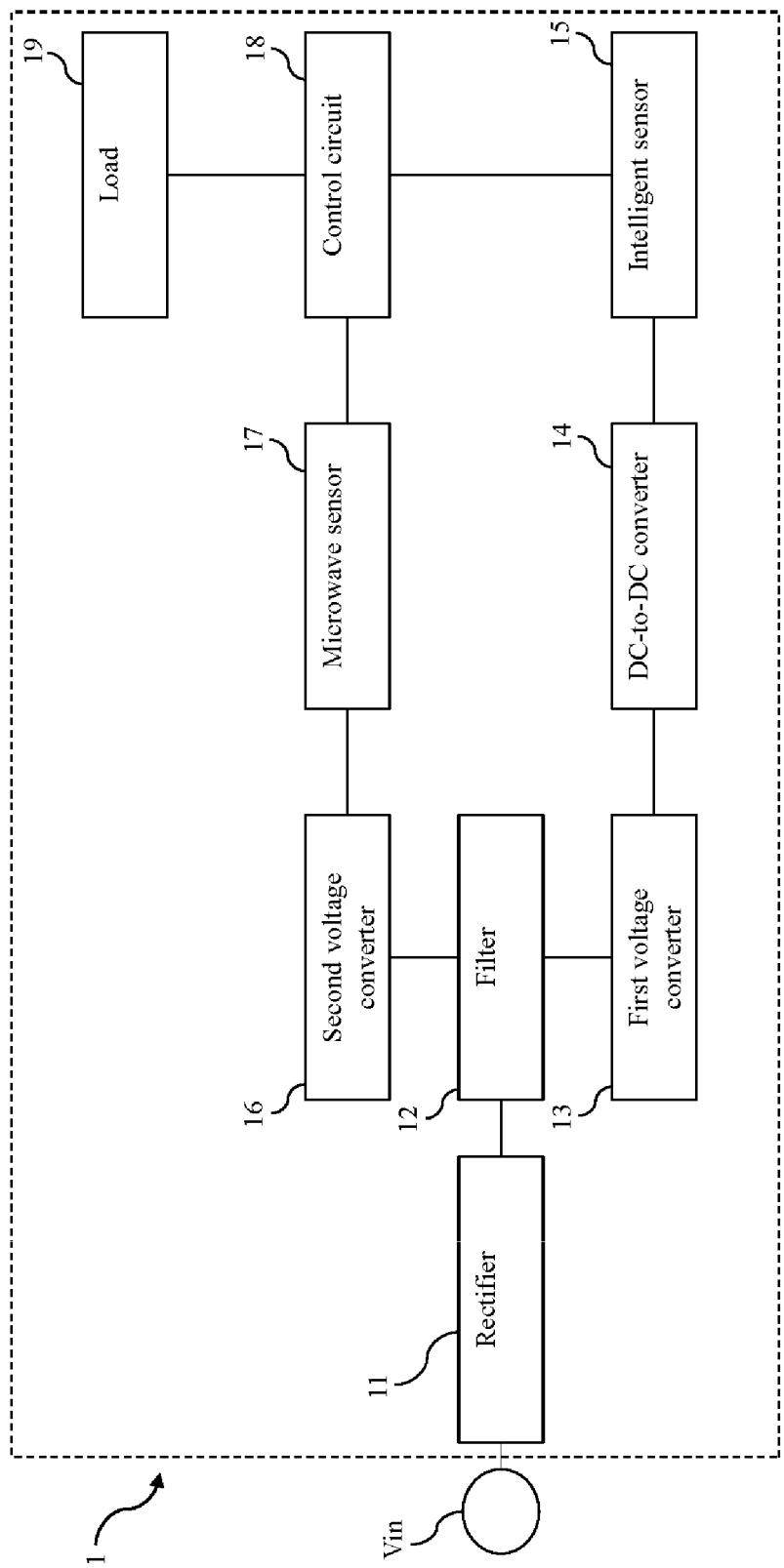
FIG. 1 is a block diagram of a circuit of a lighting device having replaceable intelligent sensor in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
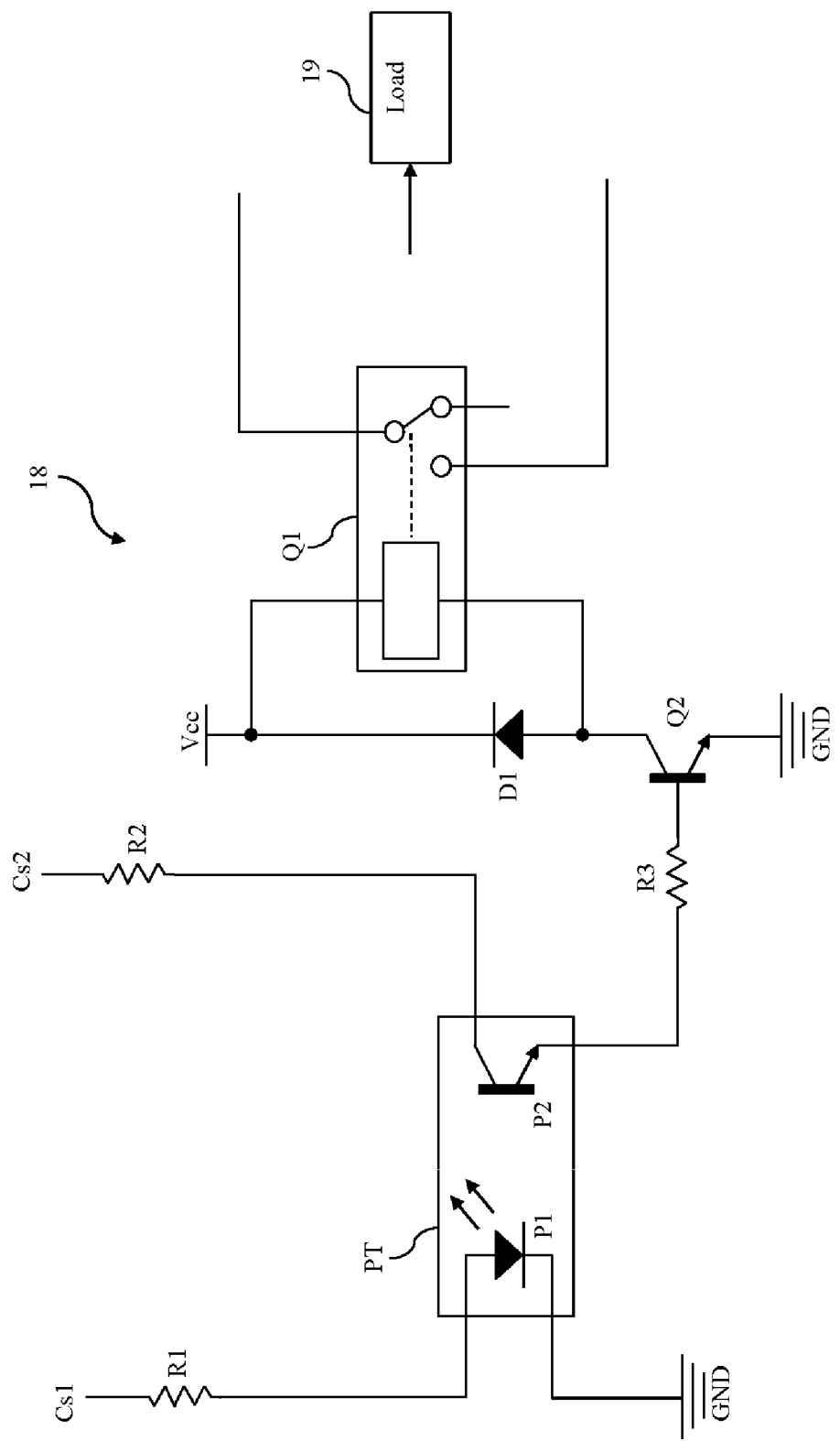
FIG. 2 is a circuit diagram of a control circuit of the lighting device having replaceable intelligent sensor in accordance with one embodiment of the present invention.

Please refer to FIG. 1 and FIG. 2. FIG. 1 is a block diagram of a circuit of a lighting device having replaceable intelligent sensor in accordance with one embodiment of the present invention. FIG. 2 is a circuit diagram of a control circuit of the lighting device having replaceable intelligent sensor in accordance with one embodiment of the present invention. As shown in FIG. 1 and FIG. 2, the lighting device 1 includes rectifier 11, a filter 12, a first voltage converter 13, a DC (Direct-current)-to-DC converter 14, an intelligent sensor 15, a second voltage converter 16, a microwave sensor 17, a control circuit 18 and a load 19.

The rectifier 11 is connected to an external power source Vin. In one embodiment, the rectifier 11 is a full-bridge rectifier, a half-bridge rectifier (bridge rectifiers) or other similar components. In one embodiment, the external power source Vin is a utility power, a generator or other similar devices.

The filter 12 is connected to the rectifier 11. In one embodiment, the filter 12 is a π filter or other similar filters.

The first voltage converter 13 is connected to the filter 12. In one embodiment, the first voltage converter 13 is a buck converter, a buck-boost converter or other similar components.

The DC-to-DC converter 14 is connected to the first voltage converter 13 and the intelligent sensor 15 is detachably connected to the DC-to-DC converter via a connection port. In one embodiment, the above connection port is a USB port, a Micro USB port, a Mini USB port or other similar ports. In one embodiment, the intelligent sensor 15 is a WiFi module, a Bluetooth module, a ZigBee module, a sensor having WiFi communication function and Bluetooth communication function, a sensor having Bluetooth communication function and ZigBee communication function, a sensor having ZigBee communication function and the WiFi communication function, or other similar components.

The above circuit design of the lighting device 1 makes the intelligent sensor 15 be replaceable. Thus, the user can replace the intelligent sensor 15 by another intelligent sensor according to actual needs and the above circuit design can be compatible with various intelligent sensors having different driving currents (the driving current of the WiFi module is 100 mA; the driving current of the Bluetooth module is 20 mA; the driving current of the ZigBee module is 10 mA). Therefore, the lighting device 1 can be more flexible in use and meet actual requirements.

The second voltage converter 16 is connected to the filter 12. In one embodiment, the second voltage converter 16 is a buck converter, a buck-boost converter or other similar components.

The microwave sensor 17 is connected to the second voltage converter 12. The microwave sensor 17 can detect a moving object to generate a sensing signal Cs1.

The control circuit 18 is connected to the microwave sensor 17. In this way, the control circuit 18 can be connected to the second voltage converter 16 and the filter 12 via the microwave sensor 17. In this embodiment, the control circuit 18 includes an optical coupler PT and a switch Q1 connected to each other. The switch Q1 may be a relay. The control circuit 18 further includes a first resistor R1, a second resistor R2, a third resistor R3, a transistor Q2 and a diode D1. The transistor Q2 may be a bipolar junction transistor (BJT). The optical coupler PT includes a photodiode P1 and a phototransistor P2. One end of the photodiode P1 is connected to the first input end of the control circuit 18 via the first resistor R1, and the other end of the photodiode P1 is connected to the grounding point GND. One end of the phototransistor P2 is connected to the second input end of the control circuit 18 via the second resistor R2, and the other end of the phototransistor P2 is connected to one end of the third resistor R3. The other end of the third resistor R3 is connected to the first end (base) of the transistor Q2; the second end (emitter) of the transistor Q2 is connected to the grounding point GND; the third end (collector) of the transistor Q2 is connected to one end (positive electrode) of the diode D1 and the first input end of the switch Q1. The second end (negative electrode) of the diode D1 is connected to the second input end of the switch Q1 and an operational voltage source Vcc. The output end of the switch Q1 is connected to the load 19.

The load 19 is connected to the control circuit 18. In one embodiment, the load 19 is a light-emitting diode (LED), a fluorescent light, a light bulb or other similar components.

In this way, the rectifier 11 can receive the voltage inputted by the external power source Vin to drive the intelligent sensor 15, the microwave sensor 17 and the control circuit 18 via the above circuit structure.

The rectifier 11 can receive the voltage inputted by the external power source Vin to output two high DC voltages, which can be processed by one or more high-frequency switches, the first voltage converter 13 and the second voltage converter 14 in order to generate two DC outputs. Accordingly, the above electronic components can be driven by the DC outputs. As set forth above, the lighting device 1 includes the first DC power supply path formed by the first voltage converter 13 and the second DC power supply path formed by the second voltage converter 16. Then, the intelligent sensor 15 can be driven by the first DC power supply path, and the microwave sensor 17, the control circuit 18 and the load 19 can be driven by the second DC power supply path. The first DC power supply path can realize a voltage output having low ripple (e.g., 3.3V) via the first voltage converter 13 and the DC-to-DC converter 14. The second DC power supply path can provide a stable operational voltage for the microwave sensor 17 via the second voltage converter 16, such that the microwave sensor 17 can normally operate. The above power supply path design can be compatible with the circuit designs of most of currently available lighting devices with the need to change the circuit designs of these lighting devices.

The embodiment just exemplifies the present invention and is not intended to limit the scope of the present invention; any equivalent modification and variation according to the spirit of the present invention is to be also included within the scope of the following claims and their equivalents.

Figure 3:
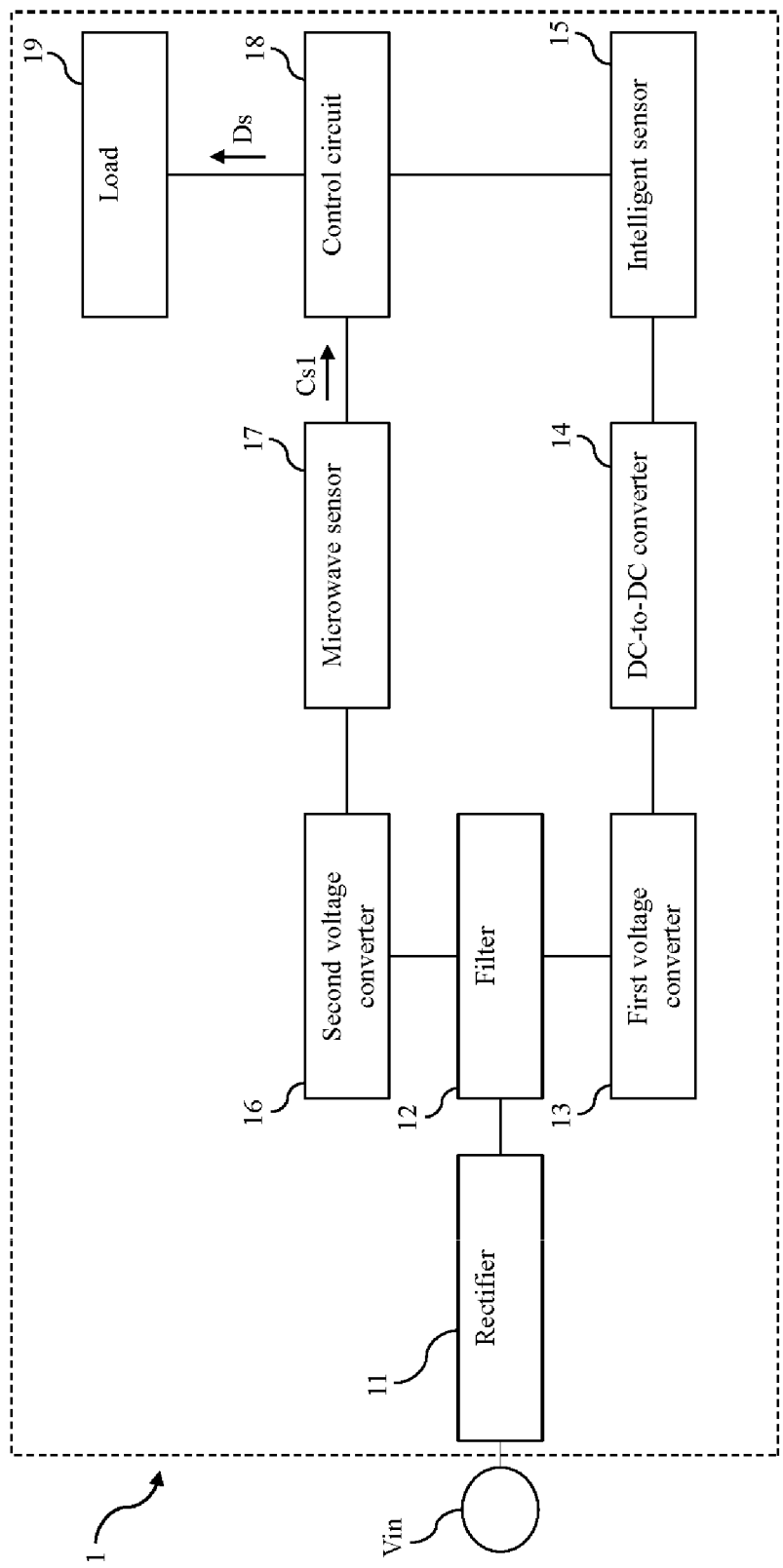
FIG. 3 is a first schematic view of one of operational states of the lighting device having replaceable intelligent sensor in accordance with one embodiment of the present invention.

Please refer to FIG. 3, which is a first schematic view of one of operational states of the lighting device having replaceable intelligent sensor in accordance with one embodiment of the present invention; please refer to FIG. 2. As shown in FIG. 3, when the microwave sensor 17 detects a moving object, the microwave sensor 17 outputs a sensing signal Cs1 (high-level signal). The sensing signal Cs1 is inputted into the photodiode P1 via the first input end of the control circuit 18 to emit a light signal to turn on the phototransistor P2 in order to turn on the switch Q1. Afterward, the control circuit 18 generates a driving signal Ds to drive the load 19. In one embodiment, the sensing signal Cs1 is a pulse-width modulation (PWM) signal.

The embodiment just exemplifies the present invention and is not intended to limit the scope of the present invention; any equivalent modification and variation according to the spirit of the present invention is to be also included within the scope of the following claims and their equivalents.

Figure 4:
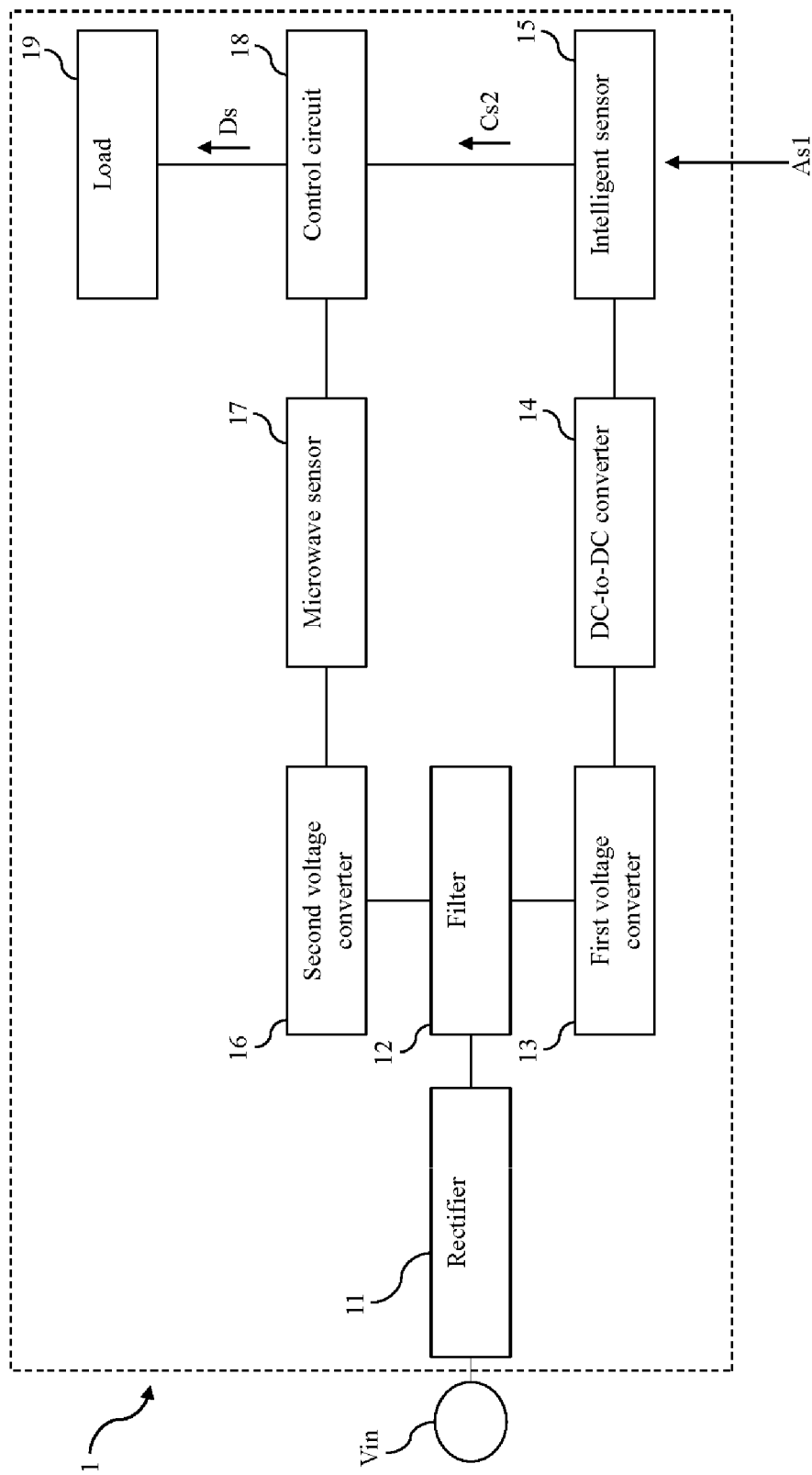
FIG. 4 is a second schematic view of one of the operational states of the lighting device having replaceable intelligent sensor in accordance with one embodiment of the present invention.

Please refer to FIG. 4, which is a second schematic view of one of the operational states of the lighting device having replaceable intelligent sensor in accordance with one embodiment of the present invention; please also refer to FIG. 2. As shown in FIG. 4, the user can transmits a first adjustment signal As1 to the intelligent sensor 15 via an external electronic device (e.g., smart phone, tablet computer, laptop computer, etc.). Then, the intelligent sensor 15 generates a first control signal Cs2. The first control signal Cs2 is inputted into the phototransistor P2 via the second input end of the control circuit 18 to turn on the phototransistor P2 so as to turn on the switch Q1. Then, the control circuit 18 generates the driving signal Ds to drive the load 19. The intelligent sensor 15 can be wiredly or wirelessly connected to the control circuit 18, such that the intelligent sensor 15 can communicate with the control circuit 18. In one embodiment, the first control signal Cs2 is a PWM signal. Accordingly, the user can remotely control the lighting device 1 via the external electronic device.

In addition, the intelligent sensor 15 can generate several PWM signals by the same mechanism in order to perform different operations.

As described above, via the above operational mechanism and circuit design, the lighting device 1 can realize large signal control via small signal. accordingly, the performance of the lighting device 1 can be significantly enhanced in order to further satisfy actual requirements.

The embodiment just exemplifies the present invention and is not intended to limit the scope of the present invention; any equivalent modification and variation according to the spirit of the present invention is to be also included within the scope of the following claims and their equivalents.

Figure 5:
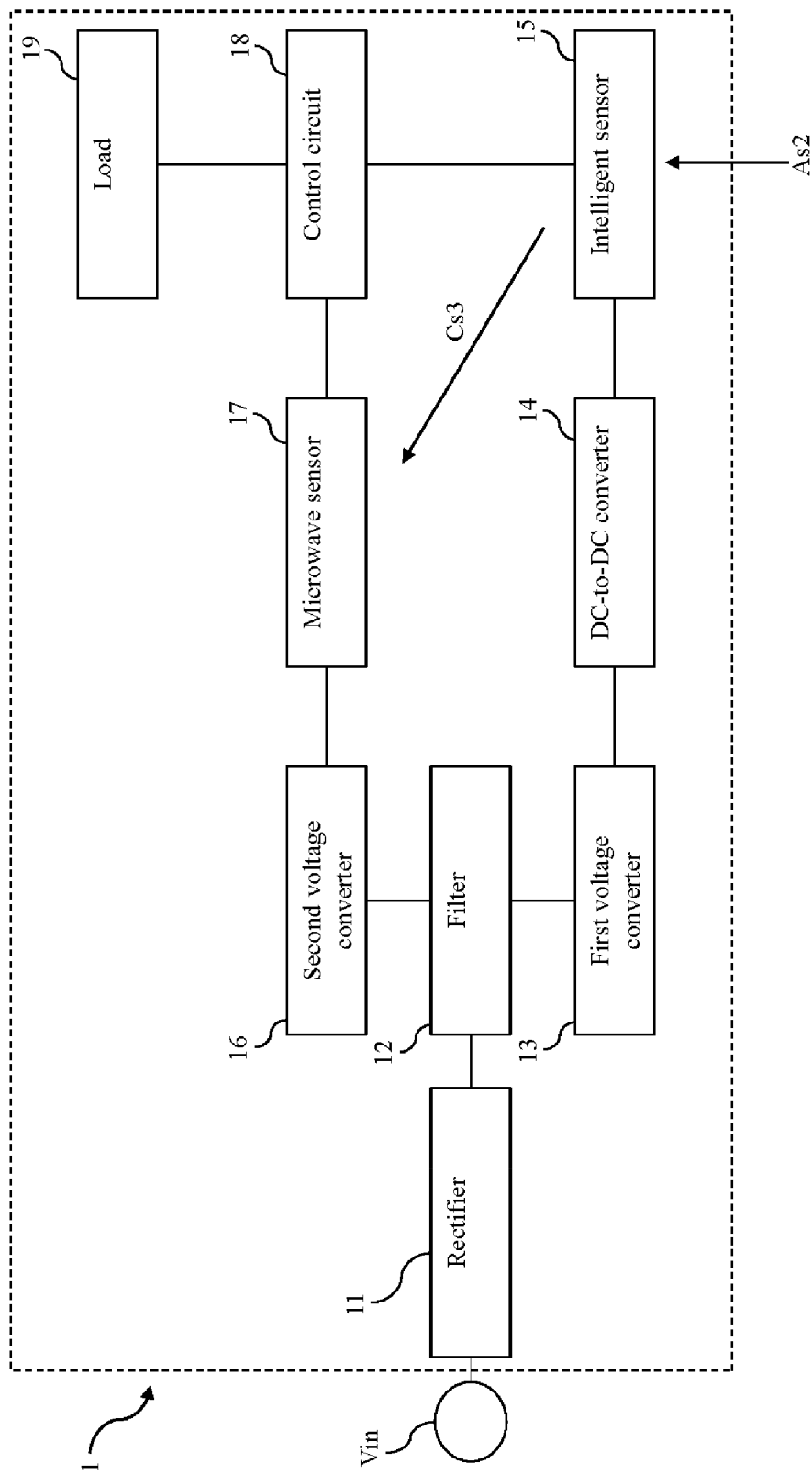
FIG. 5 is a third schematic view of one of the operational states of the lighting device having replaceable intelligent sensor in accordance with one embodiment of the present invention.

Please refer to FIG. 5, which is a third schematic view of one of the operational states of the lighting device having replaceable intelligent sensor in accordance with one embodiment of the present invention; please also refer to FIG. 2. As shown in FIG. 5, the user can transmit a second adjustment signal As2 to the intelligent sensor 15 via the external electronic device (e.g., smart phone, tablet computer, laptop computer, etc.). Afterward, the intelligent sensor 15 generates a second control signal Cs3 to the microwave sensor 17 and transmits the second control signal Cs3 to the microwave sensor 17 in order to change the operational mode of the microwave sensor 17. In one embodiment, the second control signal Cs3 is a PWM signal. For example, the user can adjust the delay time of the microwave sensor 17 outputting the sensing signal Cs1 or other relevant settings with a view to meeting actual requirements.

The intelligent sensor 15 of the lighting device 1 can generate the second control signal Cs3 and transmit the second control signal Cs3 to the microwave sensor 17, such that the operational mode of the microwave sensor 17 can be changed. Thus, the user can dynamically adjust the operational mode of the microwave sensor 17 according to actual requirements, so the lighting device 1 can control to the requirements of different applications.

The embodiment just exemplifies the present invention and is not intended to limit the scope of the present invention; any equivalent modification and variation according to the spirit of the present invention is to be also included within the scope of the following claims and their equivalents.

It is worthy to point out that currently available lighting devices may need to be in on state for a long period of time. In order to reduce the energy consumption of these lighting devices, a large amount of money and manpower is needed to replace or substantially modify these lighting devices, which cannot meet actual requirements. In addition, these lighting devices cannot provide intelligent functions, which greatly limits the application thereof and cannot meet the future development trend. Moreover, the users cannot effectively monitor these lighting devices, so the users cannot conveniently maintain or repair these lighting devices. On the contrary, according to one embodiment of the present invention, the lighting device includes a filter, a first voltage converter, a DC-to-DC converter, an intelligent sensor, a control circuit, a load and a rectifier. The first voltage converter is connected to the filter. The DC-to-DC converter is connected to the first voltage converter. The intelligent sensor is detachably connected to the DC-to-DC converter. The control circuit is connected to the filter, and includes an optical coupler and a switch connected to each other. The load is connected to the control circuit. The filter is connected to the filter and an external power source so as to drive the intelligent sensor and the control circuit. The intelligent sensor generates a first control signal to control the optical coupler to turn on the switch, such that the control circuit generates a driving signal to drive the load. The above circuit design of the lighting device makes the intelligent sensor be replaceable, so the user can replace the intelligent sensor by another intelligent sensor according to actual requirements. The above circuit design can be compatible with intelligent sensors having different driving currents. Thus, the lighting device can be more flexible in use and meet actual requirements.

According to one embodiment of the present invention, the lighting device includes a first direct-current (DC) power supply path formed by the first voltage converter and a second DC power supply path formed by the second voltage converter. The lighting device can drive the intelligent sensor by the first DC power supply path, and drive the microsensor and the load via the second DC power supply path. The above power supply path design can be compatible with the circuit designs of most of currently available lighting devices without the need to significantly change the circuit designs of these lighting devices. Thus, the lighting device can be more comprehensive in application. In addition, the lighting device can be more energy-saving and the cost thereof can also be reduced.

Also, according to one embodiment of the present invention, the lighting device can generate the first control signal via the intelligent sensor to turn on the optical coupler of the control circuit so as to turn on the switch, such that the control circuit can generate the driving signal to drive the load. Thus, the lighting device can realize large signal control by small signal. Accordingly, the performance of the lighting device can be greatly enhanced.

Further, according to one embodiment of the present invention, the lighting device can generate a second control signal to the microwave sensor to change the operational mode of the microwave sensor. Therefore, the user can dynamically adjust the operational mode of the microwave sensor according to actual needs. Accordingly, the lighting device can satisfy actual requirements.

Moreover, according to one embodiment of the present invention, the lighting device can receive the operational data of the load via the intelligent sensor and transmit the operational data to an external electronic device. Thus, the user can effectively monitor the operational states (e.g., battery level, current, voltage, etc.), and repair or maintain the lighting device when any one of the operational states of the load is abnormal. Thus, the user can conveniently repair or maintain the lighting device, so the lighting device can normally operate for a long time.

Furthermore, according to one embodiment of the present invention, several lighting devices can be connected to each other via the intelligent sensors, so the user can control or monitor all of these lighting devices via the external electronic device and the above intelligent connection function in order to execute various intelligent functions. Thus, the lighting device can definitely conform the future development trend. As described above, the lighting device having replaceable intelligent sensor can definitely achieve great technical effects.

Figure 6:
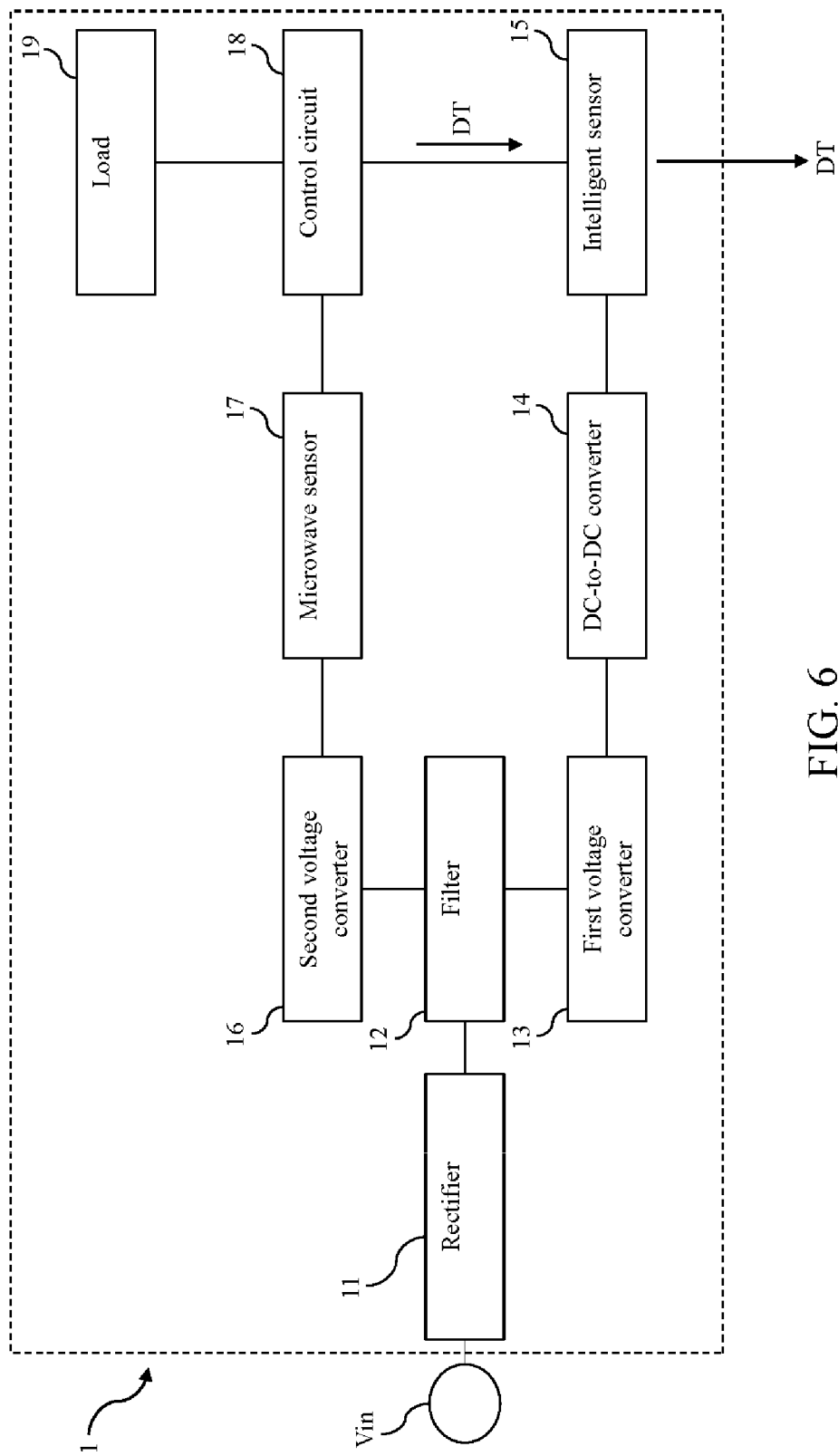
FIG. 6 is a fourth schematic view of one of the operational states of the lighting device having replaceable intelligent sensor in accordance with one embodiment of the present invention.

Please refer to FIG. 6, which is a fourth schematic view of one of the operational states of the lighting device having replaceable intelligent sensor in accordance with one embodiment of the present invention; please also refer to FIG. 2. As shown in FIG. 6, the intelligent sensor 15 can receive the operational data DT of the load 19 and transmit the operational data DT to the external electronic device. The intelligent sensor 15 can periodically perform the above operation. In this way, the user can effectively monitor the operational states of the load 19 via the external electronic device. For instance, the operational states may include one or more of the battery level of the load 19, the current of the load 19 and the voltage of the load 19, etc.

Therefore, the user can effectively monitor the operational states (e.g., battery level, current, voltage, etc.), and repair or maintain the lighting device 1 in time when any one of the operational states of the load is abnormal. Thus, the user can conveniently repair or maintain the lighting device 1, so the lighting system can normally operate for a long time.

In addition, several lighting devices 1 can be connected to each other via the intelligent sensors 15 thereof, so the user can control and monitor all of these lighting devices 1 via the external electronic device and the above intelligent connection function. The above mechanism can be combined with IoT technology so as to realize various intelligent functions, so the lighting device can definitely conform the future development trend.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device includes a filter, a first voltage converter, a DC-to-DC converter, an intelligent sensor, a control circuit, a load and a rectifier. The first voltage converter is connected to the filter. The DC-to-DC converter is connected to the first voltage converter. The intelligent sensor is detachably connected to the DC-to-DC converter. The control circuit is connected to the filter, and includes an optical coupler and a switch connected to each other. The load is connected to the control circuit. The filter is connected to the filter and an external power source so as to drive the intelligent sensor and the control circuit. The intelligent sensor generates a first control signal to control the optical coupler to turn on the switch, such that the control circuit generates a driving signal to drive the load. The above circuit design of the lighting device makes the intelligent sensor be replaceable, so the user can replace the intelligent sensor by another intelligent sensor according to actual requirements. The above circuit design can be compatible with intelligent sensors having different driving currents. Thus, the lighting device can be more flexible in use and meet actual requirements.

According to one embodiment of the present invention, the lighting device includes a first direct-current (DC) power supply path formed by the first voltage converter and a second DC power supply path formed by the second voltage converter. The lighting device can drive the intelligent sensor by the first DC power supply path, and drive the microsensor and the load via the second DC power supply path. The above power supply path design can be compatible with the circuit designs of most of currently available lighting devices without the need to significantly change the circuit designs of these lighting devices. Thus, the lighting device can be more comprehensive in application. In addition, the lighting device can be more energy-saving and the cost thereof can also be reduced.

Also, according to one embodiment of the present invention, the lighting device can generate the first control signal via the intelligent sensor to turn on the optical coupler of the control circuit so as to turn on the switch, such that the control circuit can generate the driving signal to drive the load. Thus, the lighting device can realize large signal control by small signal. Accordingly, the performance of the lighting device can be greatly enhanced.

Further, according to one embodiment of the present invention, the lighting device can generate a second control signal to the microwave sensor to change the operational mode of the microwave sensor. Therefore, the user can dynamically adjust the operational mode of the microwave sensor according to actual needs. Accordingly, the lighting device can satisfy actual requirements.

Moreover, according to one embodiment of the present invention, the lighting device can receive the operational data of the load via the intelligent sensor and transmit the operational data to an external electronic device. Thus, the user can effectively monitor the operational states (e.g., battery level, current, voltage, etc.), and repair or maintain the lighting device when any one of the operational states of the load is abnormal. Thus, the user can conveniently repair or maintain the lighting device, so the lighting device can normally operate for a long time.

Furthermore, according to one embodiment of the present invention, several lighting devices can be connected to each other via the intelligent sensors, so the user can control or monitor all of these lighting devices via the external electronic device and the above intelligent connection function in order to execute various intelligent functions. Thus, the lighting device can definitely conform the future development trend.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having replaceable intelligent sensor, comprising:
   a filter;
   a first voltage converter connected to the filter;
   a DC-to-DC converter connected to the first voltage converter;
   an intelligent sensor detachably connected to the DC-to-DC converter;
   a control circuit connected to the filter, and comprising an optical coupler and a switch connected to each other;
   a load connected to the control circuit; and
   a rectifier connected to the filter and an external power source in order to drive the intelligent sensor and the control circuit;
   wherein the intelligent sensor configured to generate a first control signal to control the optical coupler to turn on the switch, whereby the control circuit generates a driving signal to drive the load.

2. The lighting device having replaceable intelligent sensor as claimed in claim 1, wherein the optical coupler comprises a photodiode and a phototransistor configured to receive the first control signal.

3. The lighting device having replaceable intelligent sensor as claimed in claim 1, further comprises a second voltage converter connected to the filter and a microwave sensor connected to the second voltage converter, whereby the control circuit is connected to the filter via the microwave sensor and the second voltage converter.

4. The lighting device having replaceable intelligent sensor as claimed in claim 3, wherein the microwave sensor is configured to detect a moving object to generate a sensing signal in order to control the optical coupler to turn on the switch, whereby the control circuit generates the driving signal to drive the load.

5. The lighting device having replaceable intelligent sensor as claimed in claim 3, wherein the optical coupler comprises a photodiode and a phototransistor configured to receive the sensing signal.

6. The lighting device having replaceable intelligent sensor as claimed in claim 1, wherein the intelligent sensor is configured to output a second control signal to the microwave sensor in order to change an operational mode of the microwave sensor.

7. The lighting device having replaceable intelligent sensor as claimed in claim 1, wherein the intelligent sensor is a WiFi module, a Bluetooth module, a ZigBee module, a sensor having a WiFi communication function and a Bluetooth communication function, a sensor having the Bluetooth communication function and a ZigBee communication function, or a sensor having the ZigBee communication function and the WiFi communication function.

8. The lighting device having replaceable intelligent sensor as claimed in claim 1, wherein the intelligent sensor is configured to receive an operational data of the load and transmit the operational data to an external electronic device.

9. The lighting device having replaceable intelligent sensor as claimed in claim 1, wherein the load is a light-emitting diode.

10. The lighting device having replaceable intelligent sensor as claimed in claim 1, wherein the filter is a $\pi$ filter, the rectifier is a bridge rectifier and the switch is a relay.

* * * * *